United States Patent
Pan et al.

(10) Patent No.: US 8,897,325 B1
(45) Date of Patent: Nov. 25, 2014

(54) FIBER LASER

(71) Applicant: National Tsing Hua University, Hsinchu (TW)

(72) Inventors: Ci-Ling Pan, Hsinchu (TW); Alexey Zaytsev, Hsinchu (TW); Chih-Hsuan Lin, Taipei (TW); Yi-Jing You, Yilan (TW); Feng-Hua Tsai, Zhongli (TW); Chi-Luen Wang, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 14/022,771

(22) Filed: Sep. 10, 2013

(30) Foreign Application Priority Data

May 20, 2013 (TW) .............................. 102117697 A

(51) Int. Cl.
*H01S 3/30* (2006.01)
*H01S 3/098* (2006.01)
*H01S 3/083* (2006.01)
*H01S 3/067* (2006.01)
*H01S 3/11* (2006.01)

(52) U.S. Cl.
CPC ........... *H01S 3/06791* (2013.01); *H01S 3/1106* (2013.01)
USPC .................................. 372/6; 372/18; 372/94

(58) Field of Classification Search
CPC .... H01S 3/067; H01S 3/06791; H01S 3/1106
USPC .................................................. 372/6, 18, 94
See application file for complete search history.

(56) References Cited

U.S. PATENT DOCUMENTS 6,570,892 B1    5/2003    Lin et al.
2006/0227816 A1   10/2006   Liu

FOREIGN PATENT DOCUMENTS

TW           201123659        7/2011

OTHER PUBLICATIONS

Zaytsev et al., "A controllable noise-like operation regime in a Yb-doped dispersion-mapped fiber ring laser", Laser Phys Lett. 10, Feb. 14, 2013, 5 pages.

*Primary Examiner* — Armando Rodriguez
(74) *Attorney, Agent, or Firm* — Muncy, Geissler, Olds & Lowe, P.C.

(57) ABSTRACT

A fiber laser having a ring resonance path comprises a pump light source, a Yb-doped optical fiber and a light modulation unit. The pump light source emits a pump light. The Yb-doped optical fiber is coupled with the pump light. The light modulation unit includes a grating pair, a diaphragm and two reflective elements. The grating pair is coupled with the pump light. The diaphragm includes an aperture. The light transmitted by the grating pair partially passes through the aperture and reaches one of the reflective elements to become a reflective light, and the reflective light passes through the aperture and is transmitted through the grating pair and the other reflective element to be coupled back with the ring resonance path.

10 Claims, 7 Drawing Sheets

FIBER LASER

CROSS REFERENCE TO RELATED APPLICATIONS

This Non-provisional application claims priority under 35 U.S.C. §119(a) on Patent Application No(s). 102117697 filed in Taiwan, Republic of China on May 20, 2013, the entire contents of which are hereby incorporated by reference.

BACKGROUND OF THE INVENTION

1. Field of Invention

The invention relates to a fiber laser.

2. Related Art

Fiber laser, due to its advantages such as high stability, small size, portability and easy installation, plays an important role in the fields of optical communication, spectrum measurement and optical analysis. Besides, fiber laser has very high slope efficiency and optical power output, so it has become a widely applied laser system in industries.

Ultrashort pulse laser (also referred to ultrafast laser) usually means the pulse laser with the pulse duration being of the order of a picosecond (10-12) or less. The widely applied ultrafast laser currently is the Ti:Sapphire mode-locked laser and its derivative technology with a wavelength range from 700 to 900 nanometers, a pulse duration of about 100 femtoseconds (10-13), a repetition rate of about 80 MHz and a peak power up to 10 KW or more. As to the pulse duration, energy and operating stability of the ultrafast laser, they are good enough to induce a nonlinear effect and thus can be applied to the microscopic technology, bringing out various applications.

The optical fiber doped with ytterbium (Yb) is a gain medium and is widely researched recently due to its broad gain bandwidth, high saturation intensity and high slope efficiency. Besides, the mode-locked method can be used to further reduce the laser pulse duration to the order of a picosecond to femtosecond. The mode-locked method includes active mode locking, passive mode locking, synchronously pumped mode locking, self mode locking and colliding mode locking.

Besides, more and more researches are done for the noise-like pulse of the fiber laser, which has a higher pulse power and a narrower peak in spectrum and is thus suitable for a long-distance transmission without the distortion. Furthermore, due to its broader bandwidth, more information can be carried during the detection or transmission. So, more and more researchers contribute themselves to the topic of noise-like pulses.

However, the center frequency and the bandwidth of the pulse laser generated by the fiber laser are fixed and can not be adjusted at liberty, so that the applicability thereof is reduced. Therefore, it is an important subject to provide a fiber laser that can generate high-power pulse laser and the center frequency and bandwidth of the generated pulse can be adjusted.

SUMMARY OF THE INVENTION

In view of the foregoing subject, an objective of the invention is to provide a fiber laser that can generate high-power pulse laser and the center frequency and bandwidth of the generated pulse can be adjusted.

To achieve the above objective, a fiber laser according to the invention having a ring resonance path comprises a pump light, a Yb-doped optical fiber and a light modulation unit. The pump light source emits a pump light. The Yb-doped optical fiber is coupled with the pump light. The light modulation unit includes a grating pair, a diaphragm and two reflective elements. The grating pair is coupled with the pump light. The diaphragm includes an aperture. The light transmitted by the grating pair partially passes through the aperture and reaches one of the reflective elements to become a reflective light, and the reflective light passes through the aperture and is transmitted through the grating pair and the other reflective element to be coupled back with the ring resonance path.

In one embodiment, the pump light source includes at least a laser diode.

In one embodiment, the fiber laser further comprises a first fiber alignment unit, which is coupled with the light transmitted by the Yb-doped optical fiber.

In one embodiment, the fiber laser further comprises a polarizing-splitting unit by which the light transmitted by the first fiber alignment unit is received and split.

In one embodiment, the fiber laser further comprises a second fiber alignment unit, which receives the light transmitted by the light modulation unit and outputs it to the ring resonance path after aligning it.

In one embodiment, the Yb-doped optical fiber includes a double cladding layer.

In one embodiment, the center wavelength of the fiber laser is determined according to the position of the diaphragm on the plane perpendicular to the optical path.

In one embodiment, the center wavelength of the narrowband of the fiber laser is between 1023 nm and 1035 nm, and that of the broadband of the fiber laser is between 1042 nm and 1054 nm.

In one embodiment, the bandwidth of the fiber laser is controlled by the aperture size of the diaphragm.

In one embodiment, the fiber laser generates a Gaussian pulse or a noise-like pulse.

In summary, in the fiber laser of this invention, a ring resonance path is formed, and a Yb-doped optical fiber, grating pair and diaphragm are disposed. Thereby, the high-energy Gaussian pulse or noise-like pulse can be created, and besides, the center wavelength and bandwidth of the pulse generated by the fiber laser can be adjusted. In detail, the center wavelength of the pump light generated by the fiber laser can be determined by the position of the diaphragm on the plane perpendicular to the optical path, and the bandwidth thereof can be determined by the aperture size of the diaphragm.

Accordingly, in the fiber laser of this invention, not only a high-energy pulse can be generated, but also the center wavelength and bandwidth of the pulse can be adjusted according to the requirement. Therefore, the fiber laser of the invention can be widely applied to the various fields such as medical detection, signal communication and laser cutting.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
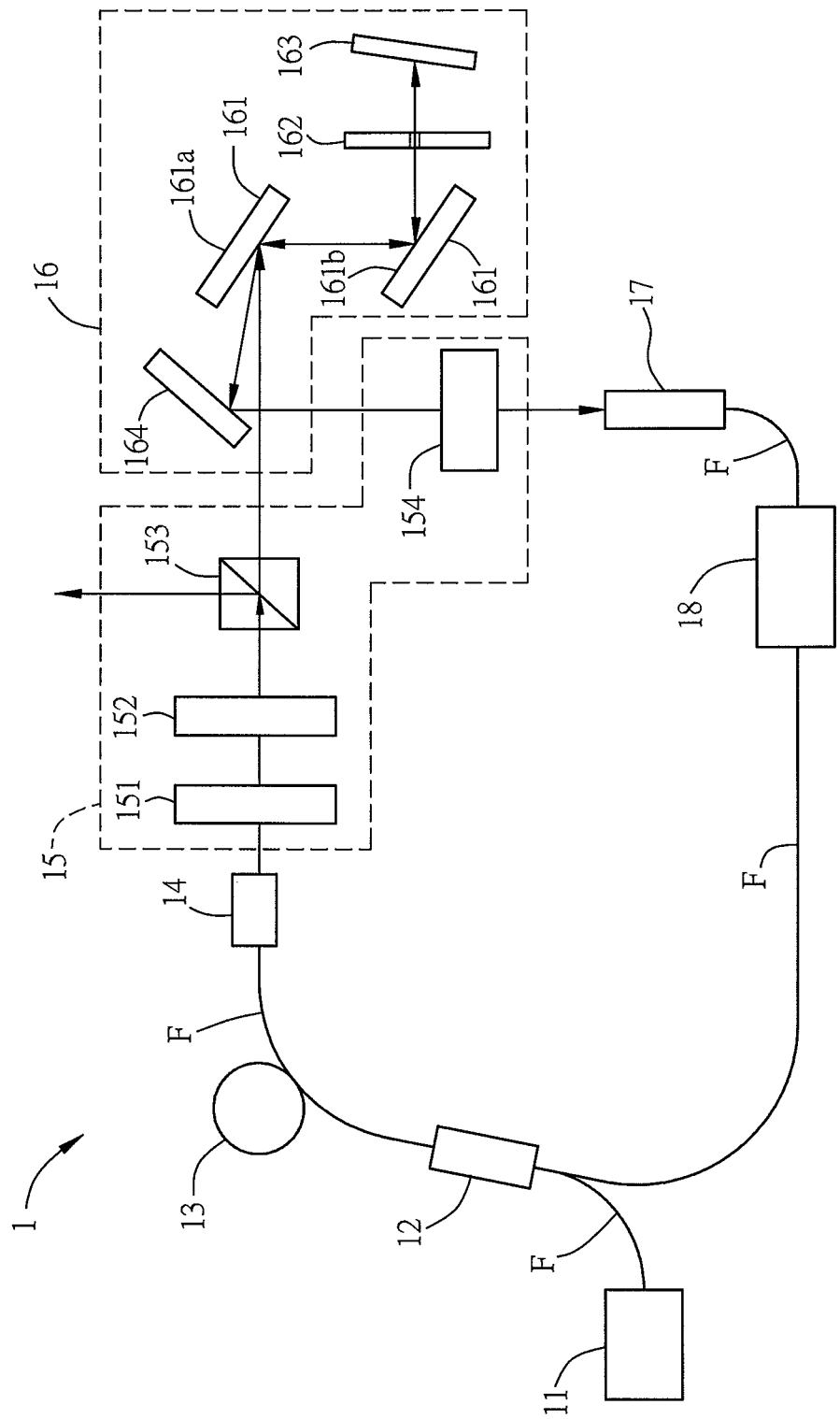
FIG. 1 is a schematic diagram of a fiber laser according to a preferred embodiment of the invention.

FIG. 1 is a schematic diagram of a fiber laser according to a preferred embodiment of the invention. As shown in FIG. 1, the fiber laser 1 is designed according to a mode-locked laser ring cavity, and thus can create Gaussian pulse or noise-like pulse with a narrowband or broadband. Therefore, it can be applied to the fields of optical detection (such as optical coherence tomography, OCT), radar system, signal communication, laser cutting, etc. The fiber laser 1 includes a pump light source 11, a passive optical fiber F, a power combiner unit 12, an ytterbium (Yb)-doped optical fiber 13, a first (optical) fiber alignment unit 14, a polarizing-splitting unit 15, a light modulation unit 16, a second fiber alignment unit 17 and a light separation unit 18.

The pump light source 11 can include at least one laser diode to emit a pump light. In this embodiment, the pump power of the pump light source 11 can be between 4 Watts and 13 Watts, and herein it is 13 W with a wavelength of 915 nm as an example.

The power combiner unit 12 is connected to the pump light source 11 through the passive optical fiber F so that the pump light emitted by the pump light source 11 can be transmitted to the power combiner unit 12 through the passive optical fiber F. The passive optical fiber F has an inside diameter of 6 μm and an outside diameter of 125 μm. The power combiner unit 12 will amplify the power of the received pump light, and output the combined signal after combining the pump light and a power-amplified feedback signal (from the light separation unit 18).

The pump light outputted by the power combiner unit 12 continues to travel through the passive optical fiber F and is transmitted to the Yb-doped optical fiber 13. The Yb-doped optical fiber 13 can include a double cladding layer, and the core thereof is doped with Yb of a rare earth element so as to be increased in the index of refraction. Thereby, the pump light can obtain the energy gain by the transmission in the Yb-doped optical fiber 13. For example, the core diameter of the Yb-doped optical fiber 13 can be 10 μm while the outside diameter of the Yb-doped optical fiber 13 is 125 μm. Accordingly, because the Yb-doped optical fiber 13 has a relatively lager inside diameter, the nonlinear effect in the active optical fiber can be lessened a lot.

The first fiber alignment unit 14 is connected to the Yb-doped optical fiber 13 through the passive optical fiber F. The first fiber alignment unit 14 receives the pump light from the Yb-doped optical fiber 13 through the passive optical fiber F, and converts it into an aligned light that is then transmitted to the polarizing-splitting unit 15.

The polarizing-splitting unit 15 can include a half-wave plate 151, a quarter-wave plate 152, a polarizing beam splitter 153 and a second quarter-wave plate 154. The aligned light passes through the half-wave plate 151 and the quarter-wave plate 152, and then reaches the polarizing beam splitter 153, which will transmit the parallel light to the light modulation unit 16.

The light modulation unit 16 includes a grating pair 161, a diaphragm 162 and two reflective elements 163 and 164. On the optical path, the grating pair 161 is coupled with the pump light, and more precisely, coupled with a part of the pump light that is generated by the split of the polarizing beam splitter 153, for reducing the chromatic dispersion and providing the NGVD (negative group velocity dispersion). The diaphragm 162 has an aperture. The light transmitted by the grating pair 161 partially passes through the aperture of the diaphragm 162 and reaches the reflective element 163 to become a reflective light. Then, the reflective light passes through the aperture of the diaphragm 162 and is transmitted through the grating pair 161 and another reflective element 164, coupled back with the ring resonance path. Herein, the gratings of the grating pair 161 have an interval of 10.5 cm, and the number of the slits of the grating pair 161 is 600/mm, for example.

To be noted, the noise-like pulse is generated in this embodiment for example, and when the Gaussian pulse needs to be generated, the diaphragm can be replaced by a filter plate.

After experiencing the effect of the grating pair 161, the beams of the pump light of different wavelengths will have different emission angles. Therefore, the position of the diaphragm 162 on the plane perpendicular to the optical path can be adjusted such that the pump light generated by the fiber laser 1 with the desired center wavelength can pass through the aperture and thus be selected. In other words, the center wavelength of the pump light generated by the fiber laser 1 can be selected by adjusting the position of the diaphragm 162 on the plane perpendicular to the optical path.

The light reflected by the reflective element 164 passes through the second quarter-wave plate 154 and is aligned by the second fiber alignment unit 17 and then coupled back to the power combiner unit 12 through the light separation unit 18. The optical coupling of the said units is achieved by the passive optical fiber F, forming a ring resonance cavity.

Figure 2:
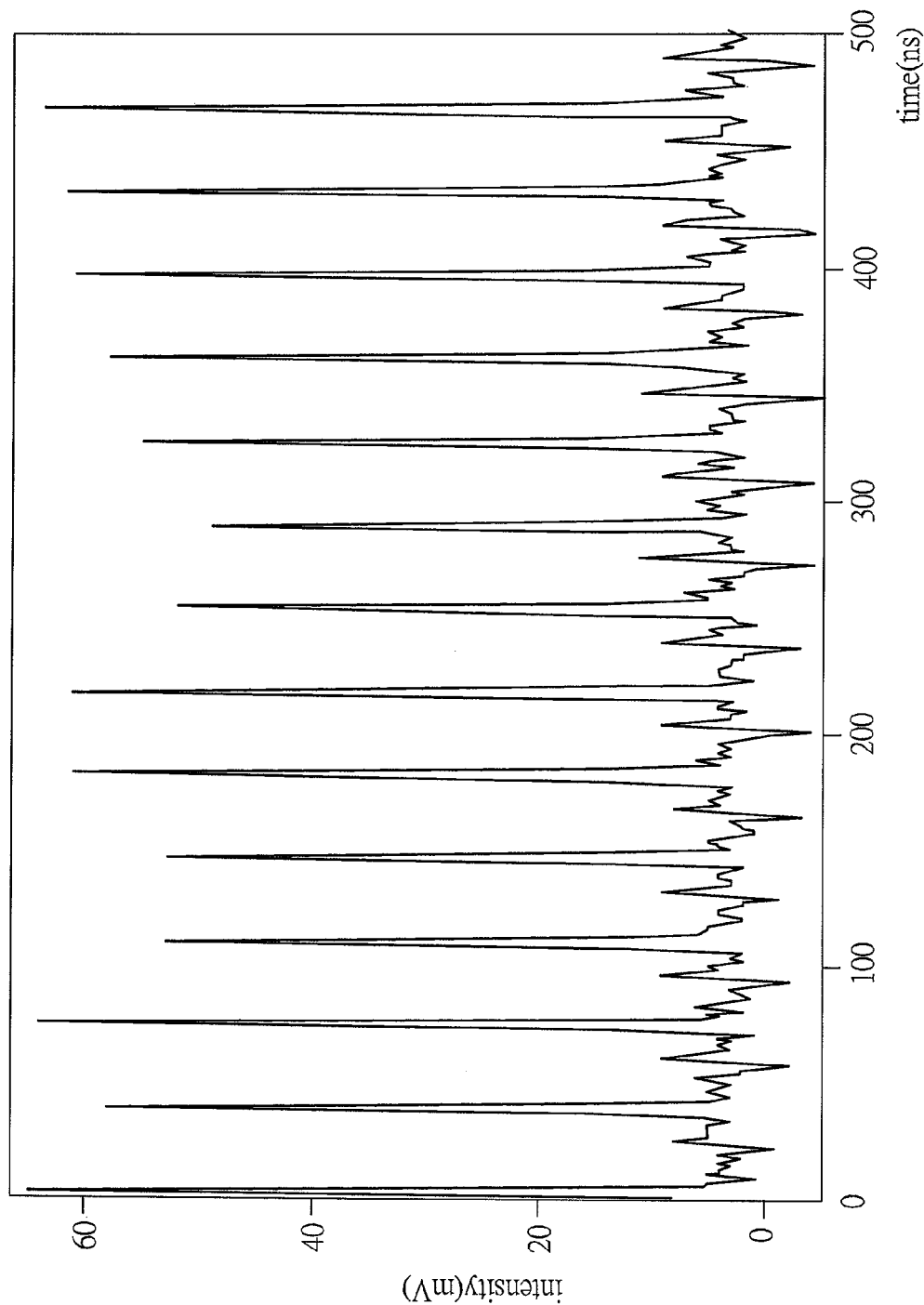
FIG. 2 is a schematic diagram showing an oscilloscope trace of the noise-like pulse generated by the fiber laser in FIG. 1.

FIG. 2 is a schematic diagram showing an oscilloscope trace of the noise-like pulse generated by the fiber laser according to the embodiment of the invention. The oscilloscope trace is obtained by a rapid InGaAs sensor. As shown in FIG. 2, the fiber laser of this embodiment can certainly generate a stable self-start mode-locked pulse string, and can be operated with the output power of the pumping power of 4~13 W and the fiber-laser output power of 0.1~1.45 W.

Figure 3:
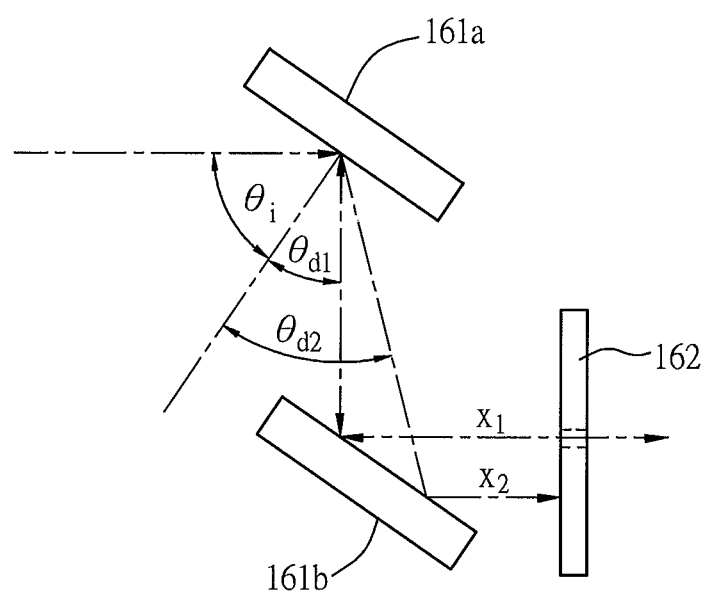
FIG. 3 is a schematic diagram of the grating pair and the diaphragm according to a preferred embodiment of the invention.

FIG. 3 is a schematic diagram of the grating pair and the diaphragm according to the embodiment of the invention. It will be illustrated, by referring to FIGS. 2 and 3, how to select the center wavelength of the pump light by adjusting the position of the diaphragm 162 on the plane perpendicular to the optical path. As shown in FIG. 3, the diffraction angles of the beams caused by the grating 161a are related to their wavelengths, conforming to the equation: $\sin \theta di = \sin \theta i - \lambda i/d$, wherein $\theta i$ means the incident angle of the beam on the grating 161a, $\theta di$ means the diffraction angle of the beam, and d means the gating spacing. With the condition of linearity, the above equation can be simplified as follows:

In the above equation, $$x_1 \cong x_2 + \sin_d \frac{b\Delta\lambda}{d}$$

x1 and x2 mean different positions of the aperture corresponding to different wavelengths (λ), θd means the average diffraction angle, d means the grating spacing (e.g. 1.666 μm), and b means the interval (e.g. 10.5 cm) between the gratings of the grating pair. In this embodiment, because the beams of different wavelengths will cause different diffraction angles, the beams transmitted by the grating 161b have different positions, according to their wavelengths, on the plane perpendicular to the optical path. Therefore, the position of the aperture of the diaphragm can be shifted such that the beam with the desired wavelength can pass through and the others are blocked. Thereby, the purpose of selecting the center wavelength is achieved. For example, if the center wavelength needs to be shifted from 1035 nm to 1045 nm (i.e. Δλ=10 nm), the position of the diaphragm will be shifted for 0.2 mm on the plane perpendicular to the optical path.

Figure 4A:
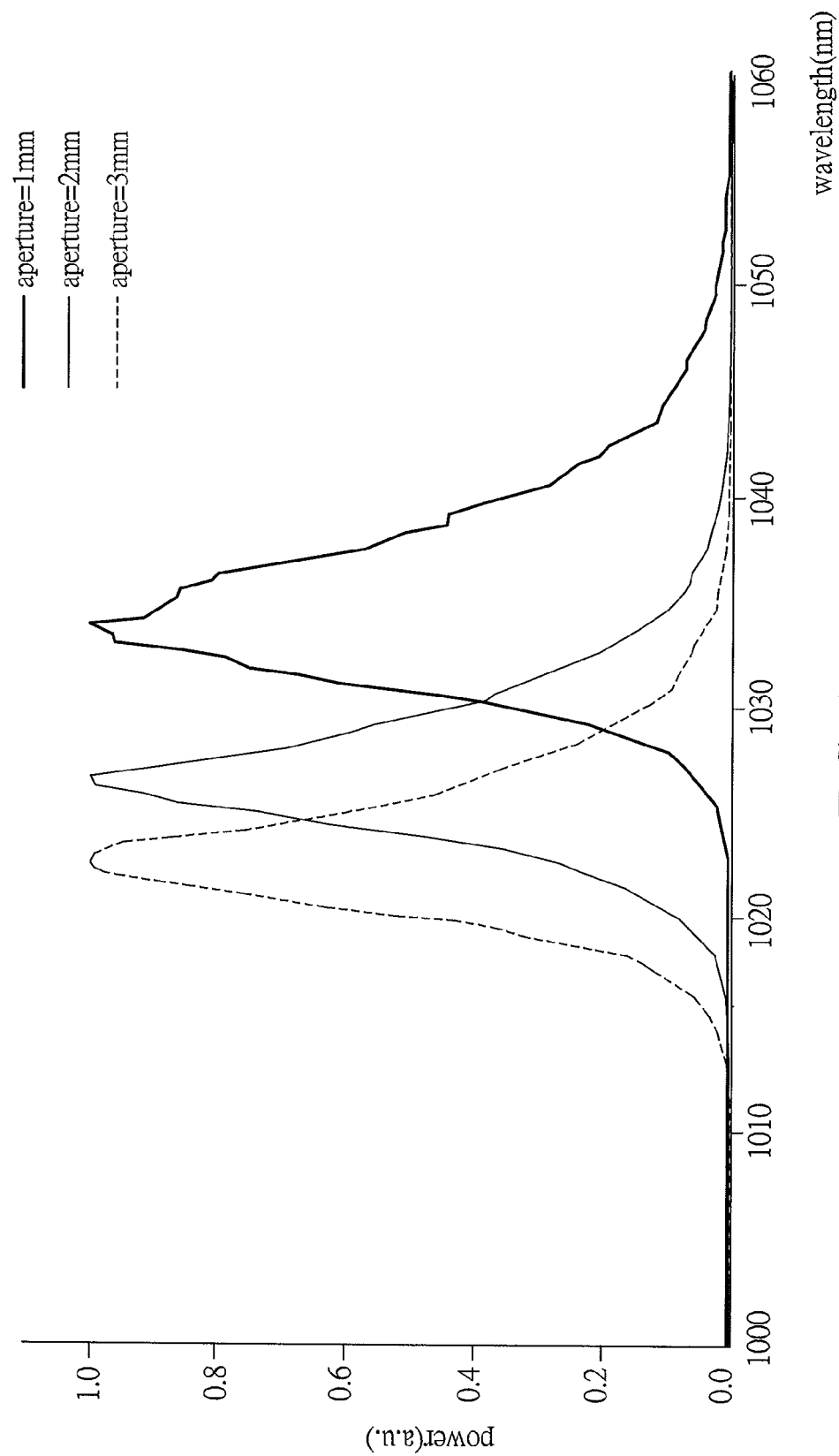
FIG. 4A is a schematic diagram showing the waveform for the narrowband by changing the aperture size of the diaphragm according to the invention.
Figure 4B:
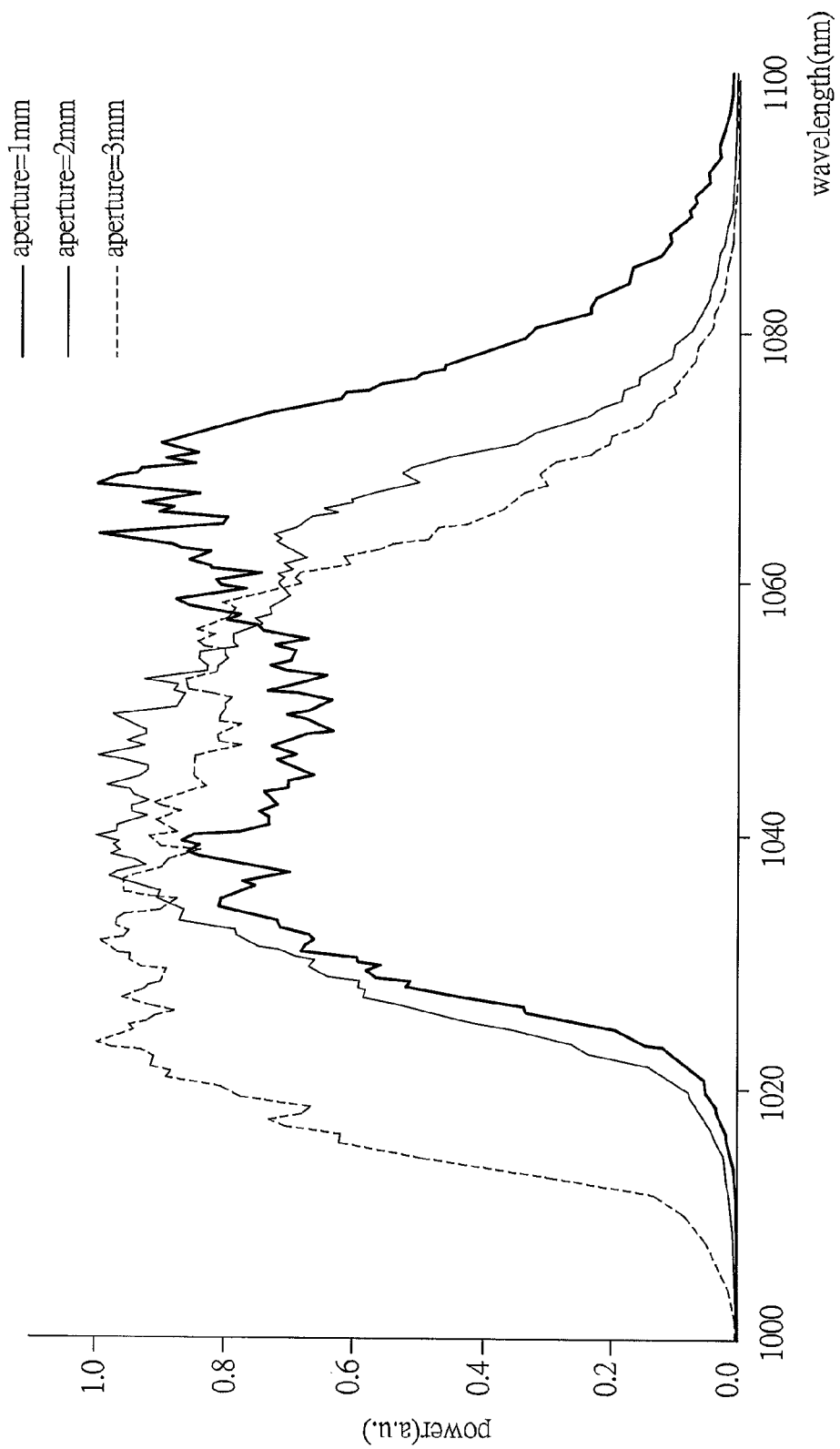
FIG. 4B is a schematic diagram showing the waveform for the broadband by changing the aperture size of the diaphragm according to the invention.

FIGS. 4A and 4B are schematic diagrams showing the value of the center wavelength of the pump light respectively for the narrowband and broadband determined with different aperture sizes of the diaphragm while the position of the diaphragm on the plane perpendicular to the optical path is fixed. As shown in FIG. 4A, when the aperture of the diaphragm is changed from 3 mm to 1 mm, the center wavelength of the narrowband will be changed from 1023 nm to 1035 nm. As shown in FIG. 4B, when the aperture of the diaphragm is changed from 3 mm to 1 mm, the center wavelength of the broadband will be changed from 1042 nm to 1054 nm. In other words, whether the narrowband or broadband, the center wavelength can be changed by adjusting the aperture size of the diaphragm, and therefore the applicability of the laser pulse of the embodiment can be increased.

Figure 5A:
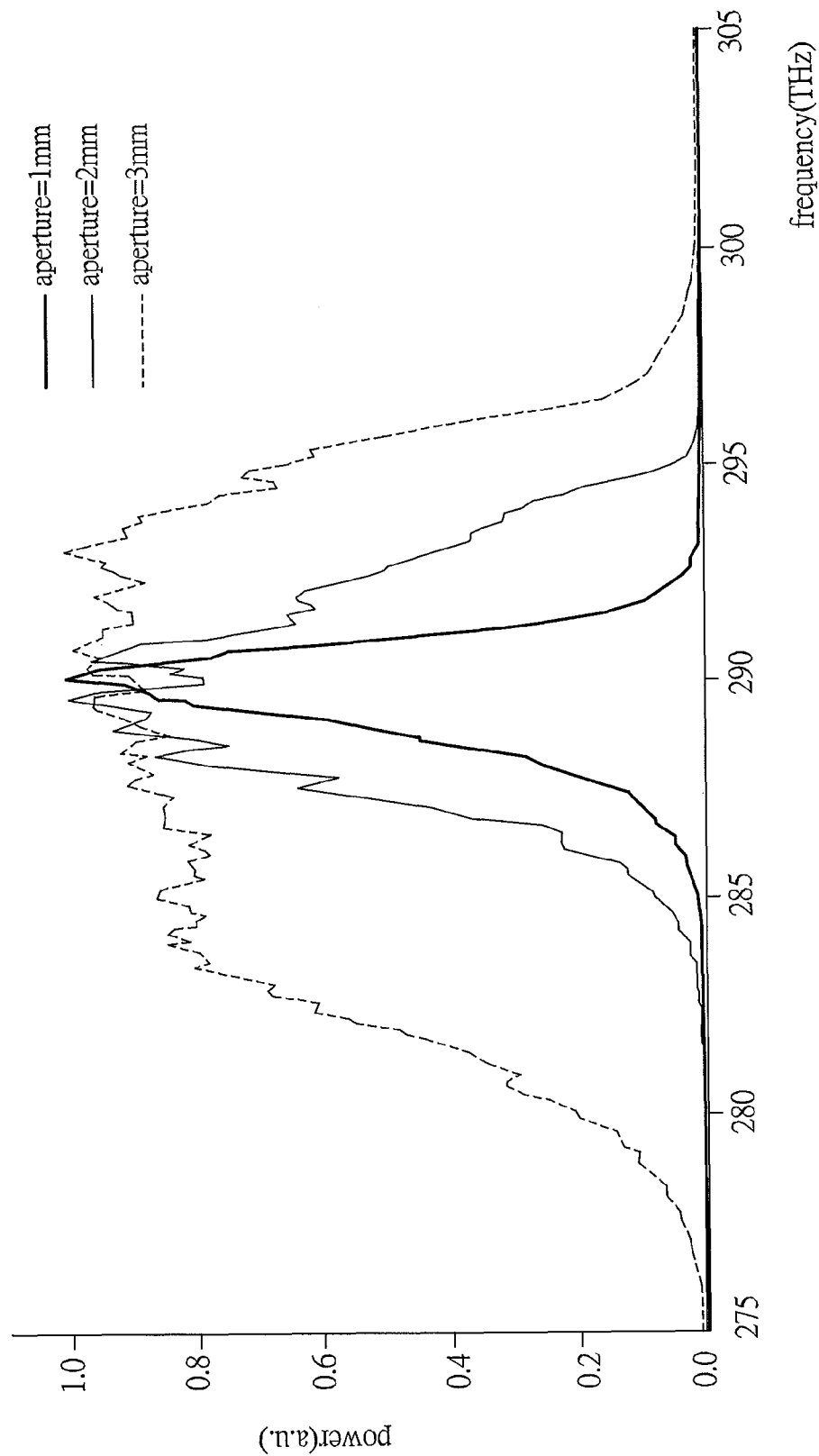
FIG. 5A is a schematic diagram showing the frequency response of the pump light with different aperture sizes of the diaphragm according to the invention.
Figure 5B:
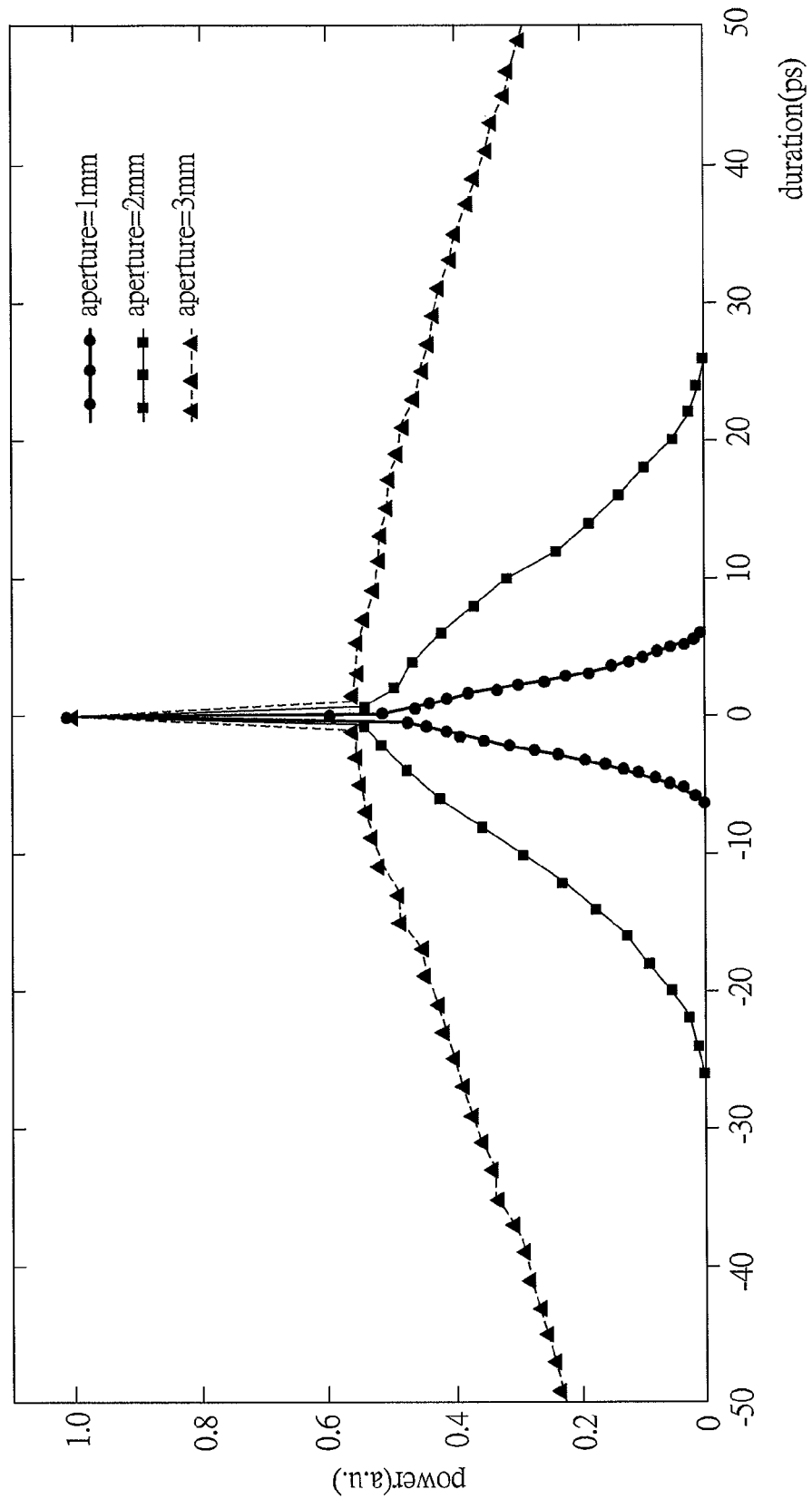
FIG. 5B is a schematic diagram showing the time response of the pump light with different aperture sizes of the diaphragm according to the invention.

FIGS. 5A and 5B are schematic diagrams respectively showing the frequency response and time response of the pump light for different aperture sizes of the diaphragm. As shown in FIG. 5A, on condition that the diaphragm is fixed in position and the wavelength is 1034 nm with the center frequency of 290 THz, when the aperture of the diaphragm is 1 mm, 2 mm or 3 mm, the bandwidth will be 2.1 THz, 5.5 THz or 14 THz, respectively. As shown in FIG. 5B, when the aperture of the diaphragm is 1 mm, 2 mm or 3 mm, the pulse duration of the half energy will be 5 ps, 20 ps or 90 ps, respectively.

To be noted, as a preferred embodiment, when the pumping power of the pump light source is 13 W and the aperture of the diaphragm is 3 mm, the noise-like pulse can be created with a pulse repetition rate of about 31.5 MHz, the time coherency of 120 fs, the noise-like pulse duration of 90 ps and a pulse energy of 47 nJ.

In summary, in the fiber laser of this invention, a ring resonance path is formed, and a Yb-doped optical fiber, grating pair and diaphragm are disposed. Thereby, the high-energy Gaussian pulse or noise-like pulse can be created, and besides, the center wavelength and bandwidth of the pulse generated by the fiber laser can be adjusted. In detail, the center wavelength of the pump light generated by the fiber laser can be determined by the position of the diaphragm on the plane perpendicular to the optical path, and the bandwidth thereof can be determined by the aperture size of the diaphragm.

Accordingly, in the fiber laser of this invention, not only a high-energy pulse can be generated, but also the center wavelength and bandwidth of the pulse can be adjusted according to the requirement. Therefore, the fiber laser of the invention can be widely applied to the various fields such as medical detection, signal communication and laser cutting.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A fiber laser having a ring resonance path, and comprising:
   a pump light source emitting a pump light;
   a Yb-doped optical fiber coupled with the pump light; and
   a light modulation unit including a grating pair, a diaphragm and two reflective elements, wherein the grating pair is coupled with the pump light, the diaphragm includes an aperture, the light transmitted by the grating pair partially passes through the aperture and reaches one of the reflective elements to become a reflective light, and the reflective light passes through the aperture and is transmitted through the grating pair and the other reflective element to be coupled back with the ring resonance path.

2. The fiber laser as recited in claim 1, wherein the pump light source includes at least a laser diode.

3. The fiber laser as recited in claim 1, further comprising:
   a first fiber alignment unit coupled with the light transmitted by the Yb-doped optical fiber.

4. The fiber laser as recited in claim 3, further comprising:
   a polarizing-splitting unit by which the light transmitted by the first fiber alignment unit is received and split.

5. The fiber laser as recited in claim 1, further comprising:
   a second fiber alignment unit receiving the light transmitted by the light modulation unit and outputting it to the ring resonance path after aligning it.

6. The fiber laser as recited in claim 1, wherein the Yb-doped optical fiber includes a double cladding layer.

7. The fiber laser as recited in claim 1, wherein the center wavelength of the fiber laser is determined according to the position of the diaphragm on the plane perpendicular to the optical path.

8. The fiber laser as recited in claim 1, wherein the center wavelength of the narrowband of the fiber laser is between 1023 nm and 1035 nm, and that of the broadband of the fiber laser is between 1042 nm and 1054 nm.

9. The fiber laser as recited in claim 1, wherein the bandwidth of the fiber laser is controlled by the aperture size of the diaphragm.

10. The fiber laser as recited in claim 1, wherein the fiber laser generates a Gaussian pulse or a noise-like pulse.

* * * * *